(12) United States Patent
Butzmann

(10) Patent No.: US 9,197,076 B2
(45) Date of Patent: Nov. 24, 2015

(54) ARRANGEMENT OF A BATTERY SYSTEM USING DC/DC CONVERTERS FOR A VEHICLE

(75) Inventor: Stefan Butzmann, Beilstein (DE)

(73) Assignee: Robert Bosch GmbH, Stuttgart (DE)

( * ) Notice: Subject to any disclaimer, the term of this patent is extended or adjusted under 35 U.S.C. 154(b) by 660 days.

(21) Appl. No.: 13/505,798

(22) PCT Filed: Sep. 21, 2010

(86) PCT No.: PCT/EP2010/063836
§ 371 (c)(1), (2), (4) Date: May 3, 2012

(87) PCT Pub. No.: WO2011/054583
PCT Pub. Date: May 12, 2011

(65) Prior Publication Data
US 2012/0217797 A1  Aug. 30, 2012

(30) Foreign Application Priority Data

Nov. 6, 2009 (DE) .......................... 10 2009 046 501

(51) Int. Cl.
*H02J 1/00* (2006.01)
*H02J 7/00* (2006.01)
*B60L 11/18* (2006.01)
*H01M 10/44* (2006.01)
*H01M 10/46* (2006.01)

(52) U.S. Cl.
CPC ........... *H02J 7/0013* (2013.01); *B60L 11/1851* (2013.01); *B60L 11/1866* (2013.01);
(Continued)

(58) Field of Classification Search
CPC .......... H02J 7/0013–7/0018; H02J 2007/0067; B60L 11/1851; B60L 11/1855; B60L 11/1864–11/1866; H01M 10/441; Y02T 10/92

USPC ............ 320/135–136; 307/150, 151, 82, 126
See application file for complete search history.

(56) References Cited

U.S. PATENT DOCUMENTS 5,659,237 A * 8/1997 Divan et al. .................... 320/119
5,789,900 A * 8/1998 Hasegawa et al. ............ 320/132
(Continued)

FOREIGN PATENT DOCUMENTS

| CN | 1543035 A | 11/2004 |
|---|---|---|
| CN | 101396975 A | 4/2009 |

(Continued)

OTHER PUBLICATIONS

International Search Report corresponding to PCT Application No. PCT/EP2010/063836, mailed Aug. 30, 2011 (German and English language document) (7 pages).

*Primary Examiner* — Jared Fureman
*Assistant Examiner* — Brett Squires
(74) *Attorney, Agent, or Firm* — Maginot, Moore & Beck LLP

(57) ABSTRACT

A battery system includes a plurality of groups of series-connected battery cells, a plurality of DC/DC converters and a first switch. The groups of series-connected battery cells are themselves in turn connected in series. The DC/DC converters are connected on the input side to a first pole and to a second pole of a group of battery cells associated with the respective DC/DC converter, and are connected in series on the output side between a first output of the battery system and a second output of the battery system. The first switch is connected in a first current path between the first pole of a first group of battery cells and the first output of the battery system, and has a control input, which is connected to a controller, for a first control signal.

8 Claims, 4 Drawing Sheets

(52) U.S. Cl.
CPC ............ *H01M10/441* (2013.01); *H01M 10/46* (2013.01); *H02J 2007/0067* (2013.01); *Y02T 10/7005* (2013.01); *Y02T 10/7055* (2013.01); *Y02T 10/7061* (2013.01); *Y02T 10/92* (2013.01); *Y10T 307/685* (2015.04)

(56) References Cited

U.S. PATENT DOCUMENTS

| | | | |
|---|---|---|---|
| 6,653,745 B1 * | 11/2003 | Masaki et al. | 307/10.1 |
| 7,282,814 B2 * | 10/2007 | Jacobs | 307/82 |
| 7,449,259 B2 * | 11/2008 | Zhu et al. | 429/422 |
| 2002/0069000 A1 * | 6/2002 | Nakao | 701/22 |
| 2005/0194937 A1 | 9/2005 | Jacobs | |
| 2008/0042493 A1 | 2/2008 | Jacobs | |
| 2008/0150366 A1 | 6/2008 | Adest et al. | |
| 2008/0164766 A1 | 7/2008 | Adest et al. | |

FOREIGN PATENT DOCUMENTS

| | | |
|---|---|---|
| EP | 2 043 218 A2 | 4/2009 |
| WO | 2006/082425 A1 | 8/2006 |
| WO | WO 2009051413 A2 * | 4/2009 |

* cited by examiner

ARRANGEMENT OF A BATTERY SYSTEM USING DC/DC CONVERTERS FOR A VEHICLE

This application is a 35 U.S.C. §371 National Stage Application of PCT/EP2010/063836, filed on Sep. 21, 2010, which claims the benefit of priority to Ser. No. DE 10 2009 046 501.4, filed on Nov. 6, 2009 in Germany, the disclosures of which are incorporated herein by reference in their entirety.

BACKGROUND

There is an increasing requirement for battery systems which are intended to be used in stationary applications such as wind power installations and emergency power supply systems, or else in vehicles. All of these requirements place stringent demands on the reliability and fail-safety. This is because complete failure of the voltage supply by the battery system can lead to a failure of the overall system. For example, in the case of wind power installations, batteries are used in order to adjust the rotor blades when the wind is strong, and thus to protect the installation against excessive mechanical loads which may damage or even destroy the wind power installation. In the event of the failure of the battery in an electric car, the latter would become impossible to drive. In turn, an emergency power supply system is actually intended to ensure interruption-free operation, for example of a hospital, and therefore, as far as possible, cannot itself fail.

In order to allow the power and energy required for the respective application to be made available, individual battery cells are connected in series, and in some cases additionally in parallel. In batteries for practical applications, a multiplicity of battery cells are connected in series in order to achieve the high operating voltage, which is required for example in a motor vehicle with an electric drive motor for the drive motor, by addition of the voltages of the individual cells. Since the total output current from the battery flows in each of the battery cells, because the battery cells are connected in series, with the charge transport taking place by means of electrochemical processes within the battery cells, the failure of a single battery cell in the extreme means that the overall arrangement can no longer provide any current, and therefore no electrical energy. Furthermore, this means that it is impossible to operate the individual battery cells matched to their respective state (state of charge, temperature, aging). A further disadvantage of pure series connection of battery cells is that the output voltage of the battery depends on the state of charge of the battery cells, and is thus variable. However, it would be a major advantage if the battery were to supply an output voltage which is as constant as possible, since the following power-electronic system components, such as inverters or drive motors can then be designed to be considerably more cost-effective, and more efficient, for this output voltage.

SUMMARY

The object of the disclosure is to introduce an apparatus which can overcome the abovementioned disadvantages of the prior art. The disclosure therefore introduces a battery system having a plurality of groups of series-connected battery cells, a plurality of DC/DC converters, and a first switch. The groups of series-connected battery cells are themselves in turn connected in series. On the input side, the DC/DC converters are connected to a first pole and to a second pole of a group of battery cells which is associated with the respective DC/DC converter and are connected in series on the output side between a first output of the battery system and a second output of the battery system. The first switch is connected in a first current path between the first pole of a first group of battery cells and the first output of the battery system, and has a control input, which is connected to a controller, for a first control signal. The first switch is designed to connect the first pole of the first group of battery cells to the first output of the battery system, in response to the first control signal.

A group may in this case contain one or more battery cells.

The disclosure combines a number of advantages. The use of DC/DC converters makes it possible to operate each group of battery cells independently of the others. Although the groups of battery cells are themselves in turn connected in series, the same current no longer flows through every battery cell (or group of battery cells), because the current is output via the DC/DC converters. In this case, each group of battery cells may be loaded, for example, as a function of the respective state of charge, independently of the other groups. Nevertheless, because they are connected in series, all the battery cells can be charged at the same time when a charging voltage is applied to the first and second outputs of the battery system. A further advantage is that the DC/DC converters need be designed only for an output power required in the typical application. If a greater output power is required, the series-connected battery cells can be connected directly to the outputs of the battery system, with the maximum output power of the battery cells being made available. Furthermore, in comparison to comparable approaches, it is possible to choose the output voltage of the DC/DC converters which are connected in series on the output side to be the same as or lower than the total voltage of the series-connected battery cells, which makes it possible to implement the DC/DC converters with particularly high efficiency. However, in some preferred embodiments of the disclosure, the output voltage of the DC/DC converters is deliberately chosen to be higher, thus allowing this advantage to be implemented optionally.

The outputs of the DC/DC converters are preferably galvanically isolated from the inputs of the DC/DC converters. Therefore, the output-side high voltage of the overall arrangement is isolated from the considerably lower voltage of the battery cells in a group of battery cells, simplifying a modular design, with battery modules which can be removed individually. In this case, the DC/DC converters may be in the form of fly-back, half-bridge, full-bridge or transformer-based resonant converters.

In one preferred refinement of the disclosure, the DC/DC converters are designed to output a first output power, and the battery cells to output a second output power, which is greater than the first output power. In this case, the controller is designed to output the first control signal to the control input of the first switch when a demanded total output power of the battery system is higher than the first output power. As has already been explained above, the series-connected battery cells can provide a higher output power than the series-connected DC/DC converters.

When a higher output power than the maximum which can be made available by the DC/DC converters is required, the controller connects the battery cells directly between the outputs of the battery system, via the first switch, as a result of which the higher required power is made available.

The DC/DC converters are preferably designed to be unidirectional. One advantage of the disclosure is that the battery cells can be charged via the first switch. Therefore, in particularly cost-effective and lightweight embodiments of the disclosure, it is possible to dispense with bi-directional DC/DC converters, that is to say DC/DC converters which can transmit electrical energy in both directions between their connections, since the DC/DC converters are not required for charging of the battery cells. Unidirectional DC/DC converters, that is to say those which can transmit electrical energy only from the battery cells to the output of the DC/DC converters, can be produced to be lighter in weight and more cost-effective, with corresponding advantages for the battery system.

One embodiment of the battery system according to the disclosure may have a first diode, which is connected in a second current path, which is in parallel with the first current path, and is connected in the forward-biased direction for a charging current for the battery cells. It is therefore possible to charge the battery cells even when the first switch is open, thus simplifying the control of the battery system. In this case, the first diode may be a substrate or "body" diode of the first switch.

In this case, the first current path in the battery system may have a second diode, which is connected in series with the first switch, and the second current path may have a second switch, which is connected in series with the first diode, with the second diode being connected in a forward-biased direction for a discharge current from the battery cells. In an arrangement such as this, it is easily possible to switch a current as a function of its direction. A plurality of switch arrangements are known from the prior art for this purpose. For example, the second diode may likewise be in the form of a substrate diode (of the second switch), with the first switch and the second switch being connected in series, and with the respective substrate diodes being biased in opposite directions. A current in a specific direction or with a specific mathematical sign can then in each case "bypass" one of the switches through its substrate diode, irrespective of its switching state, while current can flow through the other respective one of the switches only when it is also actually switched on. Alternatively, for example, the first switch and the first diode can be arranged in a current path in parallel with the second switch and the second diode.

In one preferred embodiment of the disclosure, a total output voltage of the DC/DC converters which are connected in series on the output side can be set to be higher than a battery voltage of the series-connected battery cells. In this case, the controller is designed to separately preset an output power for each DC/DC converter. As already explained, the separate presetting of the respective output power of the DC/DC converters has the advantage that the group of battery cells which is connected to the respective DC/DC converter can be loaded as a function of their respective state of charge, state of aging, etc. Furthermore, if the output voltage of the series-connected DC/DC converters can be set to be higher than the voltage of all the battery cells, it becomes possible to feed a current back from the battery cells into the battery cells again via the first switch. Since the charging current for all the battery cells is the same, but each group of battery cells can be differently loaded, it becomes possible to carry out so-called cell balancing. "Cell balancing" means the matching of the state of charge of the individual battery cells, in order to avoid a series of problems which can even lead to destruction of the battery system. In this case, the disclosure offers the advantages that individual battery cells which have a higher state of charge than others are not only discharged, but the energy drawn can also be supplied to other battery cells with virtually no losses. In the course of cell balancing, a DC/DC converter which is associated with a group of battery cells with a higher state of charge thus draws more electrical energy from this group of battery cells than the other DC/DC converters, making this available on the output side. The electrical energy made available on the output side of all the DC/DC converters flows back again into all the battery cells as a charging current, although, as a result of the drawing and charging of energy from the group of battery cells with a higher state of charge, energy is transmitted overall to other battery cells.

A second aspect of the disclosure relates to a motor vehicle having an electric drive motor for driving the motor vehicle, and to a battery system, which is connected to the electric drive motor, according to the first disclosure aspect.

BRIEF DESCRIPTION OF THE DRAWINGS

The disclosure will be explained in more detail in the following text with reference to figures of exemplary embodiments. In this case, the same reference symbols denote components which are the same or are of the same type. In the figures.

DETAILED DESCRIPTION

Figure 1:
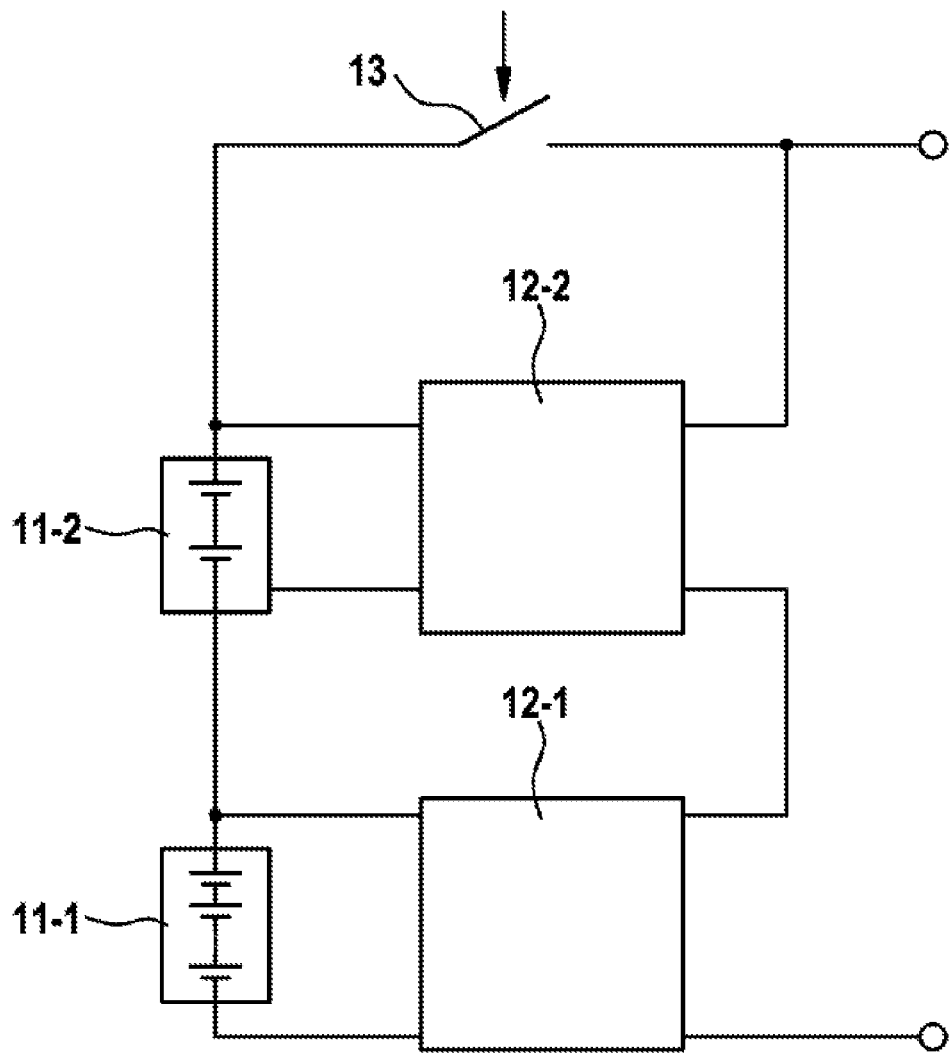
FIG. 1 shows a first exemplary embodiment of the disclosure.

FIG. 1 shows a first exemplary embodiment of the disclosure. The battery system has a plurality of series-connected battery cells, which in the illustrated example are subdivided into two groups 11-1 and 11-2. Each group 11-1, 11-2 may contain one or more series-connected battery cells. However, the number of groups can be chosen as required for all the exemplary embodiments, and is not restricted to two. The groups of battery cells 11-1 and 11-2 are respectively connected to associated DC/DC converters 12-1, 12-2, which are themselves connected in series on the output side, as a result of which the total voltage of the battery system results in the sum of the output voltages of the individual DC/DC converters 12-1, 12-2. A first switch 13 is connected between one pole of the battery cells and one output of the battery system, and is used to connect the battery cells directly to the outputs of the battery system during charging or when the required output power is particularly high. In the illustrated example, the first switch 13 is connected between the positive pole of the battery cells and the positive output of the battery system, although the first switch 13 could, however, also just as well be connected between the negative pole of the battery cells and the negative output of the battery system. Two first switches 13 may, of course, also be provided at both poles of the battery system.

Figure 2:
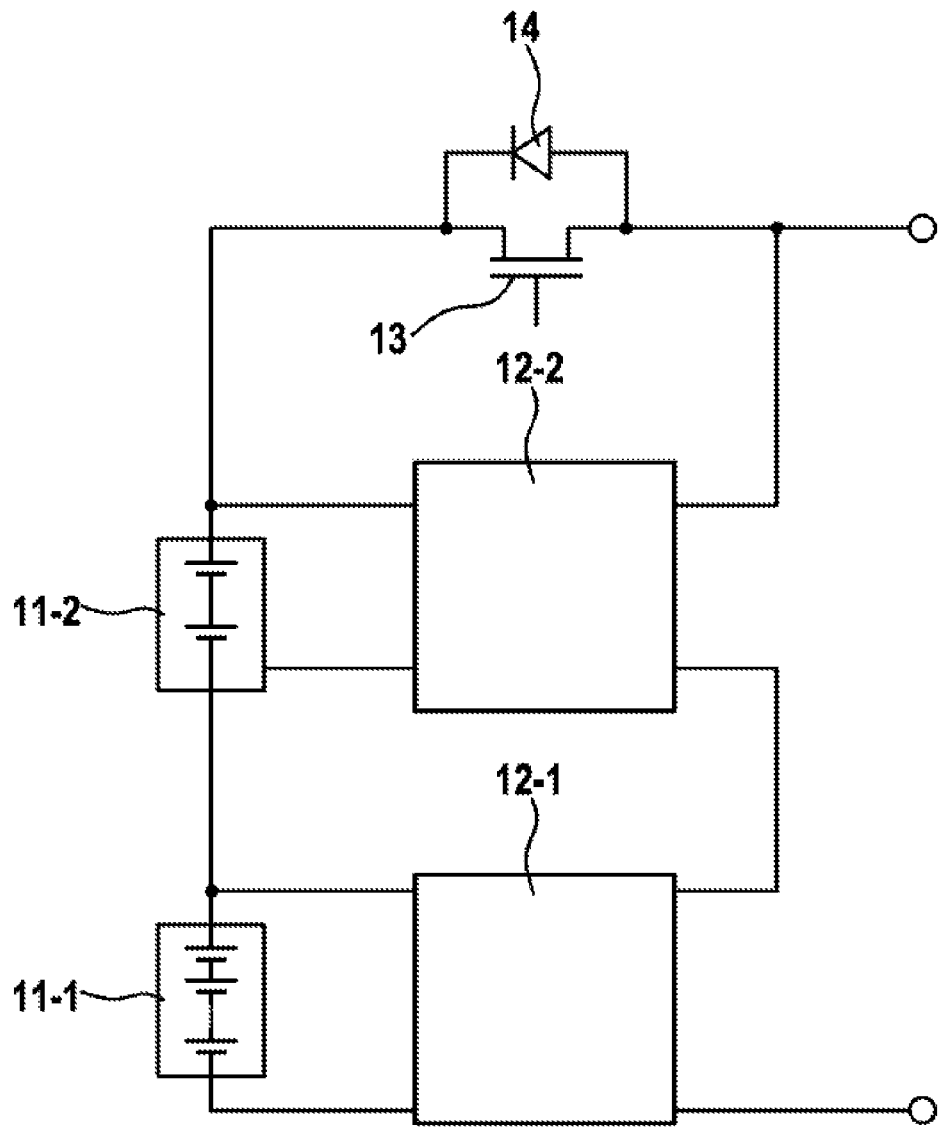
FIG. 2 shows a second exemplary embodiment of the disclosure.

FIG. 2 shows a second exemplary embodiment of the disclosure. The second exemplary embodiment corresponds essentially to the first exemplary embodiment. In this case, the first switch 13 is in the form of an MOS transistor. A first diode 14 is connected in a parallel, second current path, allowing a charging current for the battery cells to flow independently of the switching state of the first switch 13, provided that the output voltage of the battery system is higher than the total voltage of the series-connected battery cells. As already mentioned, this can be done within a cell-balancing process or during generator operation, for example during braking of a motor vehicle which is equipped with a battery system such as this.

Figure 3:
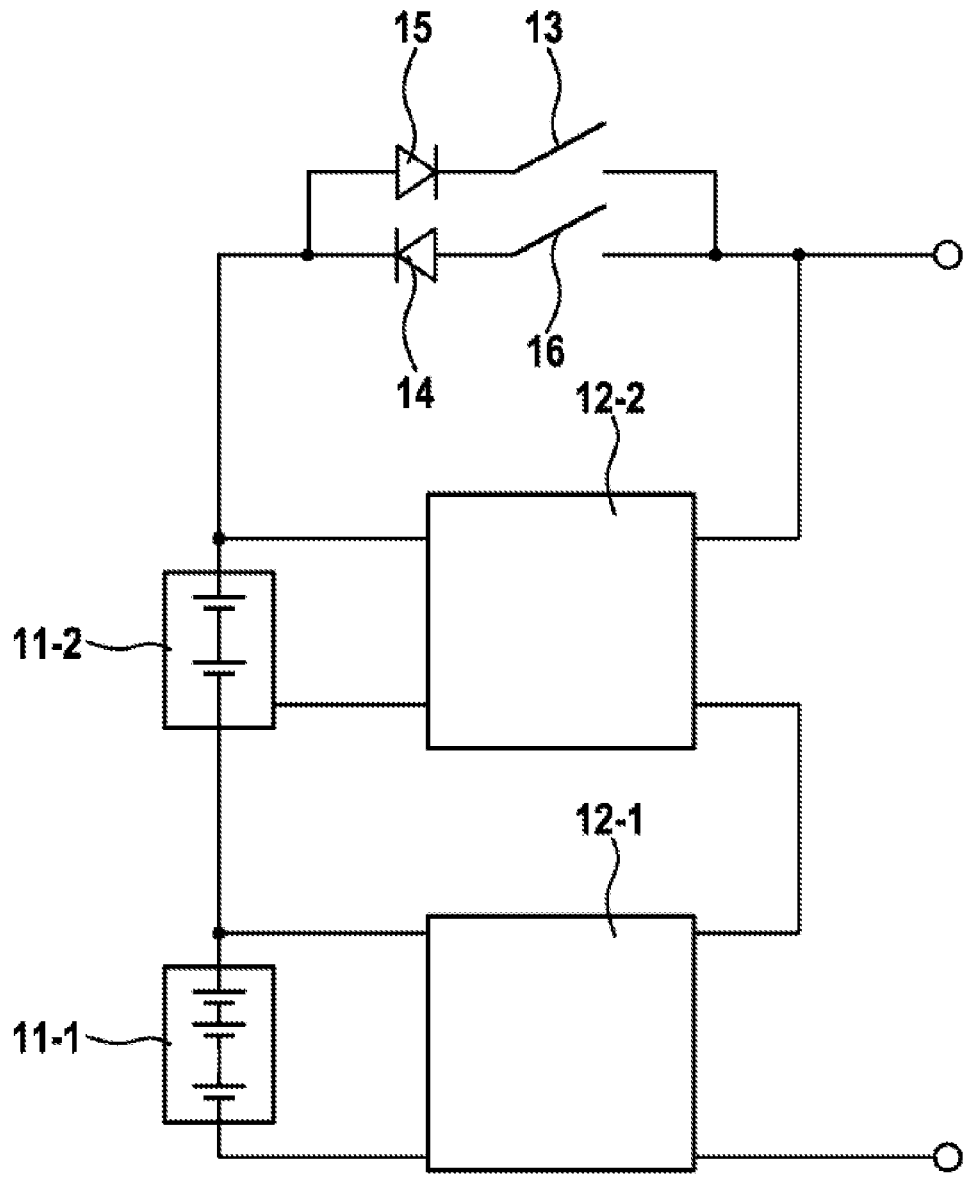
FIG. 3 shows a third exemplary embodiment of the disclosure.

FIG. 3 shows a third exemplary embodiment of the disclosure, which once again corresponds essentially to the other illustrated exemplary embodiments. In the exemplary embodiment in FIG. 3, each of the two current paths has a diode 14, 15, which are connected in opposite directions, and a switch 13, 16. The diodes 14, 15 allow current to flow through the diode 14, 15 in the respective current path only in the forward-biased direction, with the diode 14, 15 being forward-biased or reverse-biased depending on the switching state of the switch 13, 16 associated with the diode 14, 15.

Figure 4:
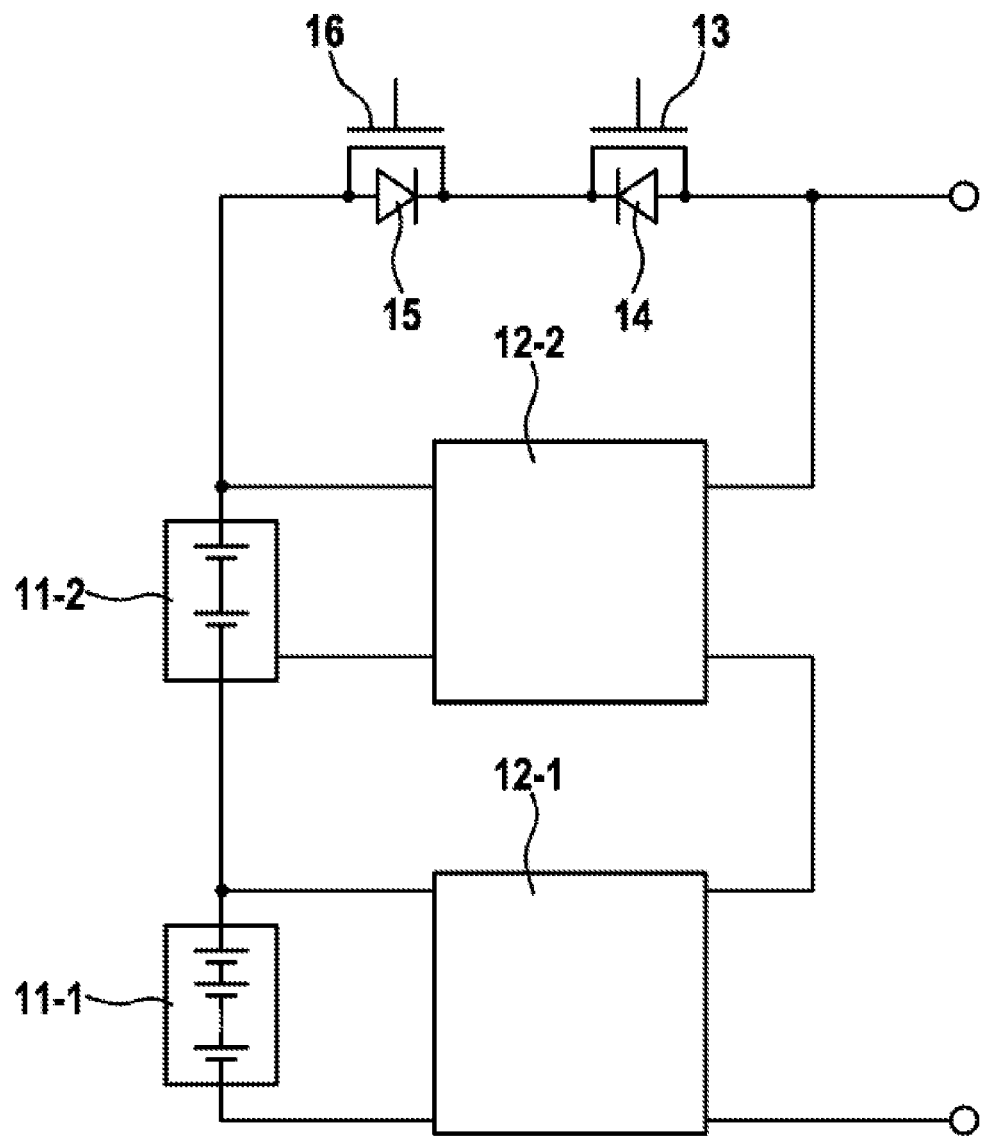
FIG. 4 shows a fourth exemplary embodiment of the disclosure.

FIG. 4 shows a fourth exemplary embodiment of the disclosure, which represents an alternative embodiment to the third exemplary embodiment. In this case, two switches 13, 16 are connected in series, with a respective diode 14 or 15 being connected in parallel with each of the switches 13, 16. The diodes 14, 15 may be in the form of body diodes of the switches 13, 16, and are once again aligned in opposite senses. In this arrangement as well, each of the switches 13, 16 can switch current with a specific mathematical sign, thus allowing independent control of charging and discharge currents in the battery system.

The invention claimed is:

1. A battery system comprising:
a first output and a second output;
a plurality of groups of series-connected battery cells, the groups being connected in series and each of the groups having a first pole and a second pole;
a plurality of DC/DC converters, each of the DC/DC converters including an input side and an output side, the input side of each of the DC/DC converters being connected between the first pole and the second pole of one of the groups of battery cells, and the output side of each of the DC/DC converters being connected in series between the first output and the second output; and
a first switch connected in a first current path between the first pole of a first group of battery cells and the first output that bypasses the DC/DC converters, the first group of battery cells being located at one end of the plurality of groups, and the first switch being configured to connect the first pole of the first group to the first output in response to a first control signal from a controller,
wherein the DC/DC converters are configured to output a first output power,
wherein the battery cells are configured to output a second output power, the second output power being greater than the first output power, and
wherein the controller is configured to output the first control signal to the first switch such that the second output power is supplied to the first output when a demanded total output power of the battery system is higher than the first output power.

2. The battery system as claimed in claim 1, wherein:
the input sides of the DC/DC converters are configured to be galvanically isolated from the first output and the second output.

3. The battery system as claimed in claim 2, wherein:
the DC/DC converters are fly-back, half-bridge, full-bridge or transformer-based resonant converters.

4. The battery system as claimed in claim 1, wherein:
the plurality of DC/DC converters are configured to be unidirectional.

5. The battery system as claimed in claim 1, further comprising:
a first diode connected in a second current path, the second current path being parallel with the first current path and the first diode being connected in a first forward-biased direction configured to provide a charging current to the battery cells.

6. The battery system as claimed in claim 5, wherein:
the first current path has a second diode connected in series with the first switch, and
the second current path has a second switch connected in series with the first diode, the second diode being connected in a second forward-biased direction configured to receive a discharge current from the battery cells.

7. The battery system as claimed in claim 1, wherein:
a total output voltage of the DC/DC converters is configured to be set higher than a battery voltage of the series-connected battery cells, and
the controller is configured to separately preset an output power of each of the DC/DC converters.

8. A motor vehicle, comprising:
an electric drive motor configured to drive the motor vehicle; and
a battery system including:
a first output and a second output;
a plurality of groups of series-connected battery cells, the groups being connected in series and each of the groups having a first pole and a second pole;
a plurality of DC/DC converters, each of the DC/DC converters including an input side and an output side, the input side of each of the DC/DC converters being connected between the first pole and the second pole of the one of the groups of battery cells, and the output side of each of the DC/DC converters being connected in series between the first output and the second output; and
a first switch connected in a first current path between the first pole of a first group of battery cells and the first output that bypasses the DC/DC converters, the first group of battery cells being located at one end of the plurality of groups, and the first switch is configured to connect the first pole of the first group to the first output in response to a first control signal from a controller,
wherein the DC/DC converters are configured to output a first output power,
wherein the battery cells are configured to output a second output power, the second output power being greater than the first output power, and
wherein the controller is configured to output the first control signal to the first switch such that the second output power is supplied to the first output when a demanded total output power of the battery system is higher than the first output power.

* * * * *